United States Patent
Wehmeyer

(10) Patent No.: US 6,900,156 B2
(45) Date of Patent: May 31, 2005

(54) METHOD FOR PREPARING METAL CYANIDE CATALYSTS USING ZERO VALENT METALS

(75) Inventor: Richard M. Wehmeyer, Lake Jackson, TX (US)

(73) Assignee: Dow Global Technologies Inc., Midland, MI (US)

(*) Notice: Subject to any disclaimer, the term of this patent is extended or adjusted under 35 U.S.C. 154(b) by 0 days.

(21) Appl. No.: 10/506,067

(22) PCT Filed: Mar. 18, 2003

(86) PCT No.: PCT/US03/08406

§ 371 (c)(1),
(2), (4) Date: Aug. 30, 2004

(87) PCT Pub. No.: WO03/080240

PCT Pub. Date: Oct. 2, 2003

(65) Prior Publication Data

US 2005/0043171 A1 Feb. 24, 2005

Related U.S. Application Data

(60) Provisional application No. 60/366,759, filed on Mar. 21, 2002.

(51) Int. Cl.$^7$ ............................ B01J 31/00; B01J 31/02; B01J 31/06; B01J 27/26
(52) U.S. Cl. .................. 502/175; 502/161; 502/155; 502/156; 502/159; 502/162; 502/167; 502/170; 502/172
(58) Field of Search ................. 502/175, 161, 502/155, 156, 159, 162, 167, 170, 172

(56) References Cited

U.S. PATENT DOCUMENTS 5,780,584 A * 7/1998 Le-Khac et al. ............. 528/410

* cited by examiner

*Primary Examiner*—Elizabeth D. Wood

(57) ABSTRACT

Metal cyanide catalyst dispersions in initiator compounds and/or polyether are prepared by reacting an acidic metal cyanide compound a zero valent metal in a medium that is a solvent for the acidic metal cyanide compound. The resulting catalyst slurry may be combined with an initiator and/or polyether and stripped to form a catalyst/initiator or catalyst/polyether slurry. Using this method, an active alkylene oxide polymerization catalyst is prepared, and the preparation method is greatly simplified. Further, it is necessary to use a separate organic complexing agent in the preparation.

6 Claims, No Drawings

METHOD FOR PREPARING METAL CYANIDE CATALYSTS USING ZERO VALENT METALS

This application claims benefit of U.S. Provisional Application 60/366,759, filed Mar. 21, 2002.

This invention relates to methods or making metal cyanide catalysts complexes and to methods for polymerizing alkylene oxides in the presence of a metal cyanide catalyst.

Polyethers are prepared in large commercial quantities through the polymerization of alkylene oxides such as propylene oxide and ethylene oxide. This polymerization reaction is usually conducted in the presence of an initiator compound and a catalyst. The initiator compound usually determines the functionality (number of hydroxyl groups per molecule of the polymer) and in some instances imparts some desired functionality. The catalyst is used to provide an economic rate of polymerization.

Metal cyanide complexes are becoming increasingly important alkylene oxide polymerization catalysts. These complexes are often referred to as "double metal cyanide" or "DMC" catalysts, and are the subject of a number of patents, including, for example, U.S. Pat. Nos. 3,278,457, 3,278,458, 3,278,459, 3,404,109, 3,427,256, 3,427,334, 3,427,335 and 5,470,813, among many others. In some instances, these complexes provide the benefit of fast polymerization rates and narrow polydispersities. Additionally, these catalysts are associated with the production of polyethers having very low levels of monofunctional unsaturated compounds.

Development efforts have focussed mainly on one specific metal cyanide catalyst complex, zinc hexacyanocobaltate, complexed with a specific complexing agent, t-butanol. The catalyst is typically prepared in a multistep process. First, separate solutions of zinc chloride and potassium hexacyanocobaltate are prepared. These solutions are then mixed together, followed immediately by adding a mixture of water and the complexing agent, t-butanol. A catalyst complex precipitates and is recovered and washed multiple times with mixtures of water and t-butanol. This washing process removes unwanted occluded ions, particularly potassium and chlorine, and contributes the complexing agent to the structure of the catalyst complex. Often, a polyether polyol is included in one or more of these washings. Finally, the catalyst complex is dried and ground. It is then mixed with an initiator compound and an alkylene oxide to prepare the desired polyether.

The process just described is complex, requiring several washing steps. It also requires that excesses of water and t-butanol be used. The t-butanol complexing agent itself causes the complex to be difficult to handle. Often, a polyether polyol must be added to facilitate easy handling of the catalyst complex. Thus, it would be desirable to provide a less expensive, more convenient method for preparing a metal cyanide catalyst complex and a simple method for using such catalyst complexes.

This invention is a method for preparing a metal cyanide catalyst, comprising mixing an acidic metal cyanide compound with a zero valent metal in a solvent medium for the acidic metal cyanide compound under conditions such that the zero valent metal and the acidic metal cyanide compound react to form a multimetal cyanide catalyst insoluble in the solvent medium, wherein:
a) the acidic metal cyanide compound is represented by the general formula $H_w[M^1(CN)_r(X)_t]$ in which $M^1$ is a transition metal ion; each X represents a group other than cyanide that coordinates with the $M^1$ ion; r is from 4 to 6, t is from 0 to 2, and w represents the absolute value of the valence of the $M^1(CN)_r(X)_t$ group; and
b) the zero valent metal is a metal that reacts with the acidic metal cyanide compound to form an insoluble multimetal cyanide catalyst complex.

This method provides a convenient way to make metal cyanide catalysts. As is discussed more below, this method reduces or substantially eliminates alkali metals from the preparation method. As alkali metals tend to poison metal cyanide catalysts, conventional processes depend on washings to remove those ions. In this method, the washing steps to remove alkali metal ions become necessary, and the preparation method is therefore simplified. Preferably, no separate organic complexing agent compound is present in the preparation (other than the components of the solvent medium or the nonvolatile initiator compound and/or polyether), so that the costs associated with the use of the separate complexing agent are eliminated.

In this process, multiple process steps, particularly washings with complexing agents and drying steps, become unnecessary unless it is desired to isolate a solid catalyst.

Further, the acidity/alkalinity of the catalyst is straightforwardly controlled through the selection of the ratios of components.

When used to polymerize alkylene oxides, the catalysts of the invention often exhibit low induction periods and fast polymerizations.

In another aspect, this invention is a process wherein a catalyst of any of the preceding aspects is mixed with an alkylene oxide and the resulting mixture subjected to conditions sufficient to polymerize the allylene oxide to form a poly(alkylene oxide).

The acidic metal cyanide compound is represented by the general formula $H_w[M^1(CN)_r(X)_t]$, in which $M^1$, X, r, t and w are as described before. $M^1$ is preferably $Fe^{+8}$, $Fe^{+2}$, $Co^{+3}$, $Cr^{+2}$, $Cr^{+3}$, $Mn^{+2}$, $Mn^{+2}$, $Ir^{+3}$, $Ni^{+2}$, $Rh^{+8}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred. Preferred groups X include anions such as halide (especially chloride), hydroxide, sulfate, carbonate, oxalate, thiocyanate, isocyanate, isothiocyanate, $C_{1-4}$ carboxylate and nitrite ($NO^{2-}$), and uncharged species such as CO, $H_2O$ and NO. Particularly preferred groups X are NO, $NO^{2-}$ and CO.

r is preferably 5 or 6, most preferably 6; t is preferably 0 or 1, most preferably 0. w is usually 2 or 3, and is most typically 3. In most cases, r+t will equal six.

Mixtures of two or more acidic metal cyanide compounds can be used. In addition, the solution may also contain compounds that have the structure $H_wM^2(X)_6$, wherein $M^2$ is a transition metal and X is as before. $M^2$ may be the me as or different from $M^1$. The X groups in any $M^2(X)_6$ do not have to be all the same. Alkali metal salts of the acidic metal cyanide compound are preferably absent.

The acidic metal cyanide compound can be prepared in several ways. In one preparation technique, a solution of the corresponding alkali metal cyanide salt (i.e., $B_w[M^1(CN)_r(X)_t]$, where B represents an alkali metal ion) is formed. The solvent may be water, an inert organic compound as described more below, or a mixture of these. The solution may be performed at a slightly elevated temperature if necessary to dissolve the metal cyanide salt. The solution is mixed with a stoichiometric excess of a concentrated mineral acid of the form $H_dJ$, where J is an anion that forms an insoluble (in the particular solvent medium) salt with B, and d is the absolute value of the valence of J. Common mineral acids such as sulfuric acid and hydrochloric acid are preferred. Sulfuric acid is preferably used at a 75% or higher concentration, especially a 96% or higher concentration. Hydrochloric acid is preferably used at a 33–37% concentration in water. HCl can also be added by introducing gaseous HCl or by adding a solution of HCl in an appropriate solvent (such as water, diethyl ether or isopropanol). The desired acidic metal cyanide compound ($H_w[M^1(CN)_r(X)_t]$) is formed in solution. The salt of B and J precipitates out from the resulting solution. Because the salt of B and J is usually hygroscopic, a significant portion of the water is removed from the solution with the salt. The salt is easily separated from the supernatant liquid by filtration, centrifuging or other solid-liquid separation technique. If desired, the salt may be washed with additional quantities of the organic compound in order to recover any occluded $H_w[M^1(CN)_r(X)_t]$ compound. If the salt of B and J is somewhat soluble in the solvent, a second solvent (such as an organic solvent) in which the salt of B and J is less soluble may be added in order to further facilitate the precipitation of the salt.

A second method of preparing the solution of the acidic metal cyanide compound is to first form a slurry of the corresponding alkali metal cyanide salt (i.e., $B_w[M^1(CN)_r(X)_t]$), in a mixture of an inert organic compound and a stoichiometric excess of a mineral acid, preferably hydrochloric acid. The hydrochloric acid can be supplied in various ways, such as by adding concentrated aqueous HCl, introducing gaseous HCl into the organic compound, or by adding a solution of HCl in an appropriate solvent (such as diethyl ether or isopropanol). An alkali metal salt of the acid from and precipitates from the solution, leaving the desired $H_w[M^1(CN)_r(X)_t]$ compound dissolved in the organic compound. The precipitate is separated and if desired washed, as before.

In either of the foregoing two methods, an excess of mineral acid can be used to firm an acidic solution. The excess acid used is available to react with the metal as explained more below. Up to a five-fold excess of mineral acid is conveniently used.

A third convenient method of preparing the solution of the acidic metal cyanide compound is by ion exchange. An aqueous solution of the corresponding alkali metal salt (i.e., $B_w[M^1(CN)_r(X)_t]$) is eluted through a cation exchange resin or membrane which is originally in the hydrogen ($H^+$) form. Sufficient resin is used to provide an excess of $H^+$ ions. Suitable ion exchange resins include commonly available gel or macroporous, crosslinked polystyrene cation exchange resins, such as those sold by The Dow Chemical Company under the trade names DOWEX® MSC-1, DOWEX® 50WX4, as well as AMBERLYST® 15 ion exchange resin sold by Rohm & Haas. The column is typically eluted with water until the desired acidic met cyanide compound is recovered. The eluent is an aqueous solution of the $B_w[M^1(CN)_r(X)_t]$ compound. If an organic solution is desired, all or part of the water is removed from the eluent, yielding the desired acidic metal cyanide compound as solid precipitate or concentrated solution. This precipitate is then dissolved or dispersed in the organic compound. If desired, a quantity of water may be left in the acidic metal cyanide compound when it is mixed with the organic compound.

The metal may be, for example, zero valent Zn, Fe, Co, Ni, Mo, AL V, Sr, W, Mn, Sn, Pb, Cu, La and Cr. M is more preferably Zn, Fe, Co, Ni, La and Cr. M is most preferably Zn.

The solvent medium is a solvent for the acidic metal cyanide compound and any $H_wM^2(X)_6$ compounds that may be used. It is inert to the acidic metal cyanide compound and any $H_wM^2(X)_6$ compounds that may be present. In addition, it is inert to the zero valent metal (other than due to the presence of auxiliary acids, as discussed below). It is not a solvent for the multimetal metal cyanide compound that is formed in the reaction of the metal and the acidic metal cyanide compound. Thus, suitable solvent media include water and polar organic compounds such as, for example, mono alcohols such as methanol, ethanol, n-propanol, isopropanol, n-butanol, isobutanol, t-butanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol and the like; halogenated alcohols such as 2-chloroethanol, 2-bromoethanol, 2-chloro-1-propanol, 3-chloro-1-propanol, 3 bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols, polyalcohols such as ethylene glycol, propylene glycol, diethylene glycol, triethylene glycol, higher polyethylene glycols and poly (propylene glycols), glycerine, trimethylol propane and the like; ethers such as tetrahydrofuran and 1,4-dioxane; ketones such as acetone and methyl ethyl ketone; esters such as methyl acetate and ethyl acetate, nitriles such as acetonitrile, and diemthyl sulfoxide. Further, any of the non-volatile initiator or polyether materials described below can be used as all or part of the solvent medium. Mixtures of water and any of the foregoing polar organic compounds can be used.

Similarly, mixtures of any two or more of the foregoing organic compounds can be used. Preferred solvent media are methanol, mixtures of methanol and water, mixtures of methanol and one or more polyalcohols, and mixtures of water, methanol and one or more polyalcohols are preferred. The polyalcohol is preferably nonvolatile and miscible with the remainder of the solvent medium.

It is noted that the solvent medium may include materials that are known to form complexes with multimetal cyanide catalysts and/or act as initiators far the polymerization of alkylene oxides. In those cases, it is possible that the solvent medium (or some portion of it) becomes incorporated into the precipitated catalyst, and/or that, if not removed, will remain with the catalyst and act as an initiator when the catalyst is used to polymerize alkylene oxide polymerizations.

It is preferred to minimize or even eliminate water in the solvent medium; however, unless water is removed, the solvent media will include at least the water formed in the reaction.

It is also preferred to use a relatively volatile material as all or part of the solvent medium. Such volatile materials are readily removed from the precipitated catalyst, or a slurry of the precipitated catalyst in a non-volatile initiator and/or polyether, by stripping under vacuum under conditions of 40–85° C. and under a vacuum, such as a vacuum less than 300 torr (40 kPa), especially less than 15–30 torr (2–4 kPa) (or any lower pressure). Water, alcohols and ethers having a molecular weight of about 85 or less tend to meet these criteria. In these cases, the volatile solvent medium preferably is miscible with a non-volatile initiator compound and or polyether that is used in the subsequent alkylene oxide polymerization. Even more preferably, the solvent medium is relatively low boiling or otherwise easily stripped from the non-volatile initiator compound and/or polyether.

The metal may be directly mixed with the solution of the acidic metal cyanide compound, or else first formed into a slurry in a portion of the solvent medium. In the latter case, the slurry is mixed with the solution of the acidic metal cyanide compound in order to conduct the reaction and form the multimetal cyanide. If a separate slurry of the metal is made, the solvent medium used in making the slurry is preferably the same as or miscible with that used in the acidic metal cyanide compound solution. It is generally preferred to add the solution of the acidic metal cyanide compound to the metal.

Except in cases in which a soluble or insoluble metal salt is present, as described below, the metal and the acidic metal cyanide compound are mixed in proportions such that at least a stoichiometric amount of the metal is provided, based on the amount of acidic metal cyanide compound. Preferably about 1.2 to about 4 moles of metal (M) are delivered per mole of $M^1(CN)_r(X)_t$ ion (or combined moles of $M^1(CN)_r(X)_t$ and $M^2(X)_6$ ions, when $M^2(X)_6$ ions are present). It is preferred that the mixing be done with agitation. Agitation is preferably continued for a period after the mixing is completed. The metal cyanide catalyst, $M_b[M^1(CN)_r(X)_t]_c[M^2(X)]_d$, precipitates and forms a fine dispersion in the solvent medium.

A soluble or insoluble metal salt of the formula $M_xA^1_y$, wherein M is as described before, $A^1$ represents an anion that forms a soluble or insoluble salt with M, and x and y are integers that balance the charges in the soluble or insoluble metal salt, may be present in addition to the metal. In the case of soluble salts, $A^1$ is suitably a halide such as chloride and bromide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred. For insoluble salt, preferred anions $A^1$ are $O^{-2}$ and —OR.

If the soluble or insoluble metal salt is present, then it too can react with the acidic metal cyanide compound (and auxiliary acid, if present, as discussed below), if there is not enough metal present to consume those materials. When both the metal and a metal salt are used, the combined amount is sufficient to fully consume the acidic metal cyanide compound (i.e., at least one mole of metal plus metal salts per mole of acidic metal cyanide compound). More preferably, the combined amount of metal plus metal salts provides from about 1.8 to about 4 moles of metal salts per mole of acidic metal cyanide compound.

If only a stoichiometric amount of metal (or metal plus metal salt) is used during the precipitation step, the catalyst can be treated with additional metal salt (soluble or insoluble) in a subsequent step.

If desired, a quantity of an auxiliary acid may be present during the catalyst precipitation reaction. The auxiliary acid is an acid that is soluble in the solvent media, and is not an $H_w[M^1(CN)_r(X)^t]$ compound. The auxiliary compound may be, for example, a mineral acid of the form $H_dJ$, as described before, or an acid of the type $H_wM^2(X)_6$, where $M^2$ is a transition metal ion and H, w and X are as described before. In this context, a preferred anion X is fluoride. Preferred auxiliary acids include sulfuric acid, hydrochloric acid, hexaflurotitanic acid, hexafluorozirconic acid, and the like. The auxiliary acid may be present in quantities of from 0, preferably about 0.25, more preferably about 0.5, to about 5, preferably about 4, more preferably about 3, even more preferably about 1.5 moles per mole of acidic metal cyanide compound. This can be added in the preparation of the acidic metal cyanide compound if desired.

It is not necessary to provide enough of the metal (or metal plus metal salt) to consume the auxiliary acid, although that may be done if desired. However, any excess of metal and/or metal salt (over the acidic metal cyanide compound) will consume a like number of equivalents of the auxiliary acid to form the corresponding salt. By selecting how much of the auxiliary acid to consume, the pH of the catalyst slurry can be controlled. The pH of the catalyst slurry is advantageously controlled to about 3 to about 7, more preferably from about 4 to about 6.6, through the selection of the amount of metal and metal salts, when an auxiliary acid is used.

If enough metal is present to consume the acidic metal cyanide compound and auxiliary acid, any metal salt tends to be a "spectator" material, which, although it may participate in the reaction, is regenerated, so the overall reaction does not involve a net consumption of the metal salt.

Thus, several combinations of starting materials can be used, as follows:

A. Acidic metal cyanide compound and metal without auxiliary acid or metal salt. In this case, at least enough metal is used to consume the acidic metal cyanide compound, with an excess of the metal being preferable.

B. Acidic metal cyanide compound and mixture of metal and metal salt, without auxiliary acid. The combined amount of metal plus metal salt is sufficient to consume the acidic metal cyanide compound, with an excess being preferable. The metal is present in an amount sufficient to consume at least 30%, preferably at least about 50% more preferably at least about 75% even more preferably all of the acidic metal cyanide compound by itself. The metal salt will react with the acidic metal cyanide compound if there is not enough metal present to react with it all; otherwise, the metal salt is a "spectator" material as discussed above.

C. Acidic metal cyanide compound, auxiliary acid and metal, without metal salt. Here, at least enough metal is present to consume the acidic metal cyanide compound, with an excess of metal (relative to the acidic metal cyanide compound) being preferred. Excess metal will consume all or part of the auxiliary acid, forming the salt of the metal M and the conjugate base of the auxiliary acid. The pH of the catalyst slurry is controllable through the amount of the auxiliary acid that is consumed.

D. Acidic metal cyanide compound, auxiliary acid, plus mixture of metal and metal salt. The combined amount of metal plus metal salt is at least sufficient to consume the acidic metal cyanide compound, with an excess being preferable. The metal is present in an amount sufficient to consume at least 30%, preferably at least about 50%, more preferably at least about 75%, even more preferably all of the acidic metal cyanide compound by itself. Excess metal will consume all or part of the auxiliary acid, forming the salt of the metal M and the conjugate base of the auxiliary acid. The pH of the catalyst is controllable through the amount of the auxiliary acid that is consumed. If enough metal is present to consume all acids, the metal salt will be a "spectator" material as discussed above.

Upon reacting, the catalyst precipitates to form a slurry in the solvent medium. From this point, the catalyst can be isolated from the solvent medium and worked up to form a solid, particulate catalyst using, for example, conventional methods. Alternatively and preferably, the slurry is then formed into a dispersion in an initiator compound and/or a polyether.

To make a solid catalyst, the precipitate is isolated by, for example, filtering under vacuum, and is typically washed one or more times with water, a complexing agent, or a mixture of water and complexing agent. Following the washings, the catalyst is dried and ground to form a particulate catalyst. Such methods of preparing a particulate DMC catalyst are described, for example, in U.S. Pat. Nos. 3,278,457, 3,278,458, 3,278,459, 3,404,109, 3,427,256, 3,427,334, 3,427,335 and 6,470,813, all incorporated herein by reference.

In the preferred method, the catalyst slurry is then dispersed into a non-volatile initiator compound or polyether. The non-volatile initiator compound is an organic material having at least one heteroatom-containing group that will react with an alkylene oxide to form a covalent bond between a carbon atom of the alkylene oxide and the heteroatom, and opening the ring of the alkylene oxide to form a terminal hydroxyl group. Suitable non-volatile initiator compounds are not readily strippable from the slurry at conditions of 60° C. and 150 Torr (20 kPa) and preferred ones are not strippable from the slurry at 80° C. and 30 Torr (4 kPa) vacuum. Alcohols, thiols (R—SH compounds) and aliphatic carboxylic acids having a molecular weight of 87 or more, preferably about 87–8000, especially 87–5000, even more especially 87–1000 tend to meet these criteria. The non-volatile initiator compound may contain as few as one or as many as eight or more such heteroatom-containing groups, depending on the desired nominal functionality of the product polyether. In addition, the non-volatile initiator compound may contain one or more other functional groups that may be desirable in the product polyether, such as alkenyl or alkynyl unsaturation.

The catalyst may be dispersed into the non-volatile initiator compound or polyether after precipitation of the catalyst. Alternatively, the non-volatile initiator or polyether may be included as part or the entire solvent medium. Mixtures of non-volatile initiators and/or polyethers can be used. Part of the non-volatile initiator or polyether may be present during the catalyst precipitation step, with the remainder being added afterward, if desired.

Suitable non-volatile initiator compounds include monoalcohols such 1-t-butoxy-2-propanol, octanol, octadecanol, and the like. Suitable nonvolatile polyalcohol initiators include glycerine, 1,1,1-trimethylol propane, 1,1,1-trimethyl ethane, 1,2,3-trihydroxybutane, pentaerythritol, xylitol arabitol mannitol, 2,5-diethyl-3-hexyn-2,5-diol, 2,4,7,9-tetramethyl-5-decyne-4,7-diol sucrose, sorbitol, alkyl glucosides such as methyl glucoside and ethyl glucoside and the like. Polyether polyols, particular those having an equivalent weight of about 1000 or less, more preferably about 125–500, are also useful initiator compounds. The initiator may contain functional groups such as nitro or halo groups, and may contain unsaturation such as acrylic groups.

The polyether may be a polymer of propylene oxide and/or ethylene oxide, having an equivalent weight of 1000–8000. The polyether, in this context, either contains no heteroatom-containing group that is reactive with an alkylene oxide under polymerization conditions, or otherwise does not react to an appreciable extent with the alkylene oxide during the polymerization to form a higher molecular weight polymer product. Polyethers of particular interest are polyether polyols that are the desired product of a polymerization reaction catalyzed by the DMC catalyst of the invention.

At least enough of the metal cyanide catalyst complex is dispersed in the non-volatile initiator or polyether to provide a catalytically effective amount of the catalyst complex in the initiator mixture. Thus, the amount of catalyst complex added is generally at least about 50 ppm, based on the combined weight of the nonvolatile initiator (or polyether) plus catalyst complex, preferably at least about 200 ppm, more preferably at least about 1000 ppm. It is more preferred to form a more concentrated dispersion of the metal catalyst in the non-volatile initiator or polyether. Such a more concentrated dispersion can be divided and/or diluted with additional non-volatile initiator and/or polyether when it is used to conduct a polymerization reaction. Preferably, the concentrated non-volatile initiator (or polyether)/catalyst complex mixture will contain from about 0.2 weight percent, more preferably from about 0.5 weight percent, most preferably from about 1 weight percent especial from about 2 weight percent, to about 50 weight percent, preferably about 25 weight percent, more preferably about 10 weight percent, especially to about 5 weight percent metal catalyst complex, based on the combined weight of metal catalyst complex (as $M_b[M^1(CN)_r(X)_t]_c[M^2(X)_6]_d$ An$M^3{}_xA_y$) and non-volatile initiator and/or polyether. This more concentrated dispersion can be diluted for use.

A preferred way of dispersing the catalyst in the nonvolatile initiator or polyether is to mix the slurry of catalyst and solvent medium with the non-volatile initiator or polyether, and then remove the solvent medium. The method of removing the solvent medium will depend somewhat on the particular organic compound and non-volatile initiator or polyether. However, in most cases at least one component of the solvent medium will be more volatile than the non-volatile initiator or polyether, and is conveniently stripped through the application of heat and/or vacuum, such as heating to 40–85° C. under a vacuum, such as a vacuum less than 300 torr (40 kPa), especially 15–30 torr (2–4 kPa) or less. A nitrogen sweep or sparge, or a solvent that forms an azeotrope with the organic compound and/or water, can be used if desired to improve the removal of volatiles and water. Stripping conditions are preferably selected so that the bulk of the water (if any) in the slurry is stripped simultaneously with the organic compound. It has been found that when the organic compound is fractionated from the water in the overheads distillate (particularly in the preferred case where the organic compound is methanol) during the distillation, the catalyst sometimes exhibits longer induction times or lower activity. Water is preferably removed to a level of about 5000 ppm or below, preferably to about 3000 ppm or below, more preferably to about 2500 ppm or below.

In an alternative embodiment of the invention, the catalyst is precipitated directly in a solvent medium that also functions as an initiator compound or the polyether. As before, mixtures of acidic metal cyanide compounds can be used, and an $H_wM_2(X)_6$ compound can be included if desired. Upon mixing the reactants, the catalyst precipitates to form a catalyst/initiator or catalyst/polyether slurry that can be used directly in making poly(alkylene oxide) polymers and copolymers as described below. In this aspect, an amount of water or additional organic compound can be mixed into the starting solutions if needed to improve the dissolution of the acidic metal cyanide compound. If water or additional organic compound is used, it is advantageously stripped from the product slurry as described, before it is used to polymerize alkylene oxides.

In either of the foregoing processes, the resulting product is usually a fine dispersion of the metal cyanide catalyst complex in an initiator and/or polyether. The metal cyanide catalyst complex is present in an active form, and no other treatment or preparation is required.

The metal-containing cyanide catalyst made in accordance with this invention can be represented by the general formula:

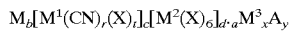

wherein M, $M^1$, $M^2$, X, A, n, r, t, x and y are all as defined before, $M^3$ is defined the same way as M; b, c and d are numbers that reflect an electrostatically neutral complex, and n is a number indicating the relative number of moles of $M^3_xA_y$. $M^3$ may be the same or different than M. $M^3_xA_y$ can be a mixture of two or more materials.

The catalyst complex of the invention is used to polymerize alkylene oxides to make polyethers. In general, the process includes mixing a catalytically effective amount of the catalyst/initiator or catalyst/polyether dispersion with an alkylene oxide under polymerization conditions and allowing the polymerization to proceed until the supply of alkylene oxide is essentially exhausted. The concentration of the catalyst is selected to polymerize the alkylene oxide at a desired rate or within a desired period of time. An amount of catalyst sufficient to provide from about 5 to about 10,000 parts by weight metal cyanide catalyst (calculated as $M_b[M^1(CN)_r(X)_t]_c[M^2(X)_6]_d \cdot nM^s_xA_y$, exclusive of any associated water and initiator and/or polyether) per million parts combined weight of alkylene oxide, and intiator and comonomers, if present. More preferred catalyst levels are from about 20, especially from about 30, to about 5000, more preferably to about 1000 ppm, even more preferably to about 150 ppm, on the same basis.

Among the alkylene oxides that can be polymerized with the catalyst complex of the invention are ethylene oxide, propylene oxide, 1,2-butylene oxide, styrene oxide, epichlorohydrin and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred in propylene oxide alone or a mixture of at least 75 weight % propylene oxide and up to about 25 weight % ethylene oxide.

In addition, monomers that win copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 5,145,883 and 3,538,043, which yield polyethers and polyester or polyetherester polyols, respectively. Hydroxyalkanoates such as lactic acid, 3 hydroxybutyrate, 3-hydroxyvalerate (and their dimers), lactones and carbon dioxide are examples of other suitable monomers that can be polymerized with the catalyst of the invention.

The polymerization reaction typical proceeds well at temperatures from about 25 to about 150° C. or more, preferably from about 80–130° C. A convenient polymerization technique involves charging the catalyst to a reactor and pressurizing the reactor with the alkylene oxide. An additional initiator compound (in addition to any present in the catalyst slurry) is generally added prior to the introduction of the monomers. Polymerization proceeds after a short induction period as indicated by a loss of pressure in the reactor. Once the polymerization has begun, additional alkylene oxide is conveniently fed to the reactor on demand until enough alkylene oxide has been added to produce a polymer of the desired equivalent weight. Short induction periods are often seen.

Another convenient polymerization technique is a continuous method. In such continuous processes, the activated catalyst is continuously fed into a continuous reactor such as a continuously stirred tank reactor (CSTR) or a tubular reactor. A feed of alkylene oxide is introduced into the reactor and the product continuously removed. Additional initiator can be added continuously or intermittently, with the catalyst slurry or as a separate stream. Those catalysts exhibiting a particularly short induction period, such as less than 15 minutes, preferably less than 10 minutes, and especially less than 5 minutes, are particular suitable for use in processes where the catalyst is added continuously.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably about 4000, more preferably to about 2500, and unsaturation of no more than 0.025 meq/g, preferably from about 0.005 to 0.02 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated. Catalyst loadings are calculated from the starting materials and ignoring any associated water and initiator.

EXAMPLE 1

$K_3Co(CN)_6$ (FW 332.35, 20.0 g, 60.18 mmol) is dissolved with slight warming (40–50° C.) in deionized water (46.6 g). A solution of 96% $H_2SO_4$ (18.44 g, approximately 180.5 mmol $H_2SO_4$) is added slowly dropwise over about 10 minutes to the stirred, warm solution of $K_3Co(CN)_6$. A light yellow solution is obtained, which is cooled to 45° C. with stirring. Methanol (200 g) is added to the solution over 5 minutes. During the addition, $K_3SO_4$ and/or $KHSO_4$ precipitates as a granular white solid. The resultant slurry is stirred for 5–10 min while cooling to 35° C. The slurry is placed in an ice water bath, stirred for 30 minutes, and vacuum filtered to remove the precipitate. The salt cake is rinsed with methanol to aid in deliquoring: the rinses are combined with the filtrate. The filtrate is a light yellow, clear solution weighing 269.53 g, containing a maximum of 4.87% $H_3Co(CN)_6$. The solution contains 1.12 meq $H^+$/g by titration. 26.87 g of the $H_3Co(CN)_6$ solution (which contains about 5.4–6.0 mmol $H_3Co(CN)_6$ and about 6.0 mmol $H_2SO_4$) is added dropwise over 80 minutes with stirring to a slurry of Zn powder (0.98 g, 12.0 mmol) and trimethylolpropane (TMP, 4.78 g, 35.6 mmol) in methanol (80 g). A small quantity of methanol is used to rinse the equipment. Most of the Zn disappears as it reacts during the addition. The slurry is stirred overnight after the addition is completed. Finely divided particles of DMC catalyst are suspended in a liquid phase.

Voranol® 2070 poll (a 700 molecular weight polypropylene oxide) triol from Dow Chemical) (95.65 g) is then added and the mixture is stirred for 10 minutes. Volatiles (including the methanol are then distilled from the slurry on a rotoevaporator, at temperatures gradually increasing to 75–80° C. and vacuum gradually increasing to 15–30 torr (2–4 kPa), with a it nitrogen sweep. The final product weight is 102.85 g, and it contains about 3.02% dispersed DMC catalyst particles.

EXAMPLE 2

$K_3Co(CN)_6$ (FW 332.35, 20.0 g, 60.18 mmol is dissolved with slight warming (40–50° C.) in deionized water (46.6 g). A solution of 96% $H_2SO_4$ (24.59 g, approximately 240.7 mmol H₂SO₄) is added slowly dropwise over about 20 minutes to the stirred, warm solution of K₃Co(CN)₆. A light yellow solution is obtained. Methanol (200 g) is added to the solution over 30 minutes. During the addition, K₃SO₄ and/or KHSO₄ precipitates as a granular white solid. The resultant slurry is stirred for 5–10 min while cooling to 45° C. The slurry is cooled to 10° C. over 95 minutes, and vacuum filtered to remove the precipitate. The salt cake is rinsed with methanol to aid in deliquoring; the rinses are combined with the filtrate. The filtrate is a light yellow, clear solution weighing 324.44 g, containing a maximum of 4.04% $H_3Co(CN)_6$.

Zn powder (7.08 g, 108.3 mmol), trimethylolpropane (TMP, 23.75 g, 177 mmol) and methanol (300 g) are added to a 1 L Morton flask equipped with a stirrer and addition funnel. 162.22 g of the 4.04 wt.-% $H_3Co(CN)_6$ solution (~30.09 mmol $H_3Co(CN)_6$ and ~210 meq. H⁺) are added dropwise over 65 minutes. A small quantity of methanol is used to rinse the equipment. Most of the Zn disappears as it reacts during the addition. The slurry is stirred for 3–4 hours after the addition is completed. Finely divided particles of DMC catalyst are suspended in a liquid phase having a pH of about 5.

Methanol (5 mL) is mixed with ZnO (0.49 g, 6.0 mmol) to form a slurry. The ZnO slurry is then added to the DMC catalyst slurry with stirring. Stirring continues for about 45 minutes following the ZnO addition.

One-half (343.11 g) of the resulting product is transferred to a stripping flask. Voranol® 2070 polyol (237.48 g) is then added and the mixture is stirred for 1 hour. Volatiles (including the methanol) are then distilled from the slurry on a rotoevaporator, at temperatures gradually increasing to 75–80° C. and vacuum gradually increasing to 15–30 torr (2–4 kPa), with a slight nitrogen sweep. The final product weight is 259.25 g, and it containing about 3.00% dispersed DMC catalyst particles.

A glass vial is charged with 0.1202 g Voranol® 2070 polyol 0.5920 g propylene oxide, and 0.0024 g of the DMC catalyst slurry (about 101 ppm DMC) sealed and heated to 90° C. for 21 hours. The progress of the reaction is followed visually. The reaction mixture becomes clear after 9 minutes (indicating the onset of polymerization) and 95% conversion to polymer is achieved in 21 hours.

What is claimed is:

1. A method for preparing a metal cyanide catalyst, comprising mixing an acidic metal cyanide compound with a zero valent metal in a solvent medium for the acidic metal cyanide compound under conditions such that the zero valent metal and the acidic metal cyanide compound react to form a multimetal cyanide catalyst insoluble in that solvent medium, wherein:

a) the acidic metal cyanide compound is represented by the general formula $H_w[M^1(CN)_r(X)_t]$ in which $M^1$ is a transition metal ion; each X represents a group other than cyanide that coordinates with the $M^1$ ion; r is from 4 to 6, t is from 0 to 2, and w represents the absolute value of the valence of the $M^1(CN)_r(X)_t$ group; and b) the zero valent metal is a metal that reacts with the acidic metal cyanide compound to form an insoluble multimetal cyanide catalyst complex.

2. The method of claim 1 wherein the zero valent metal is zinc.

3. The method of claim 2 wherein the acidic metal cyanide compound is hexacyanocobaltic acid.

4. The method of claim 3 wherein the solvent medium is a volatile organic compound.

5. The method of claim 4 wherein the multimetal cyanide catalyst and solvent medium are dispersed into an initiator compound or polyether, and the solvent medium is removed to form a slurry of the multimetal cyanide catalyst in the initiator compound or polyether.

6. The method of claim 5 wherein the volatile organic compound is methanol.

* * * * *